United States Patent [19]

Okudaira

[11] 4,241,981

[45] Dec. 30, 1980

[54] COMPACT WIDE ANGLE ZOOM LENS

[75] Inventor: Sadao Okudaira, Ranzanmachi, Japan

[73] Assignee: Asahi Kogaku Kogyo Kabushiki Kaisha, Tokyo, Japan

[21] Appl. No.: 12,092

[22] Filed: Feb. 14, 1979

[30] Foreign Application Priority Data

Mar. 10, 1978 [JP] Japan .................. 53/27382

[51] Int. Cl.³ ............................ G01B 15/16
[52] U.S. Cl. .................................. 350/184
[58] Field of Search .............. 350/184, 186, 176

[56] References Cited

U.S. PATENT DOCUMENTS

| 4,153,339 | 5/1979 | Tajima et al. | 350/184 |
| 4,169,660 | 10/1979 | Nakamura | 350/184 X |

Primary Examiner—Paul A. Sacher
Attorney, Agent, or Firm—Sughrue, Rothwell, Mion, Zinn and Macpeak

[57] ABSTRACT

A compact wide angle zoom lens in order from the object side, of a divergent front lens group and a convergent rear lens group, the overall focal length being variable by mechanical movement of the front and rear lens groups. The divergent front lens group is composed, in order from the object side, of a first lens being a negative meniscus lens convex toward the object side, a second lens being a double convex positive lens or a positive cemented lens having positive and negative lenses, a third lens being a negative meniscus lens convex toward the object side, a fourth lens being a negative lens and a fifth lens being a positive lens. The convergent rear lens group is composed of a sixth lens being a positive lens, a seventh lens being a positive meniscus lens convex toward the object, an eighth lens being a double convex positive lens, a ninth lens being a double concave negative lens, the eighth and ninth lenses being cemented to each other, and the tenth lens being a positive lens. The overall lens system is composed of ten or eleven lens elements grouped into nine lens components.

2 Claims, 8 Drawing Figures

COMPACT WIDE ANGLE ZOOM LENS

BACKGROUND OF THE INVENTION

This invention relates to optics and in particular to a lens for cameras. Recent advances in camera technology have materially reduced the physical size and weight of camera bodies. This reduction in size and weight has placed on the lens designer a corresponding challenge to reduce the size of lenses for such compact camera bodies. Many lenses having a fixed resultant overall focal length have been designed with increased members internal lens elements to reduce the overall size of the lens. However, until recently this reduction in size was not applied to zoom lenses. A difficult problem was that of so-called "soft-focus" in zoom lenses, particularly in the transition range from standard lens to telephoto sizes (i.e. 50 mm–105 mm). This problem precluded the use of zoom lenses in the wide angle range (i.e. 24 mm–38 mm) where edge distortion and coma abberation compounded the focus problem.

Moreover, consumer demands for camera versatility have given rise to requirements for zoom lens designs having effective ranges sufficient to eliminate the need for multiple lenses especially when travelling. One such requirement exists in the wide angle range 24–48 mm for use in out-door scenes as well as crowded in-door conditions. Such a lens would normally replace at least standard lenses yet offer comparable results. This invention is directed to an improved zoom lens of wide angle design that is extremely compact.

Accordingly, it is an object of this invention to define a novel zoom lens of compact size.

It is another object of this invention to define a zoom lens having good optical qualities yet operative in the wide angle range.

Still another object of this invention is to define a wide angle zoom lens of compact construction that eliminates the deficiencies of the prior art.

These and other objects of this invention are accomplished by means of a novel compact wide-angle zoom lens that will be described with reference to the accompanying drawings and description of the preferred embodiment.

DESCRIPTION OF THE PREFERRED EMBODIMENTS

Figure 1:
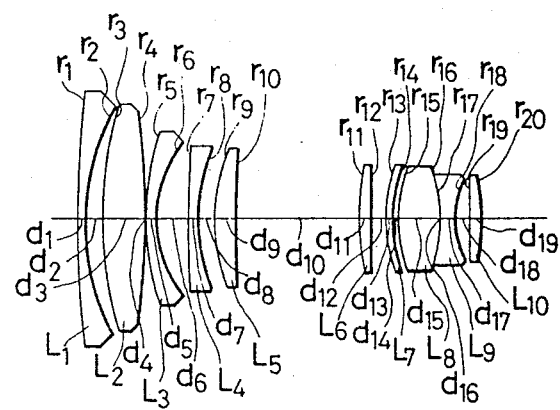
FIG. 1 shows a lens construction according to the first Example of the invention.
Figure 2:
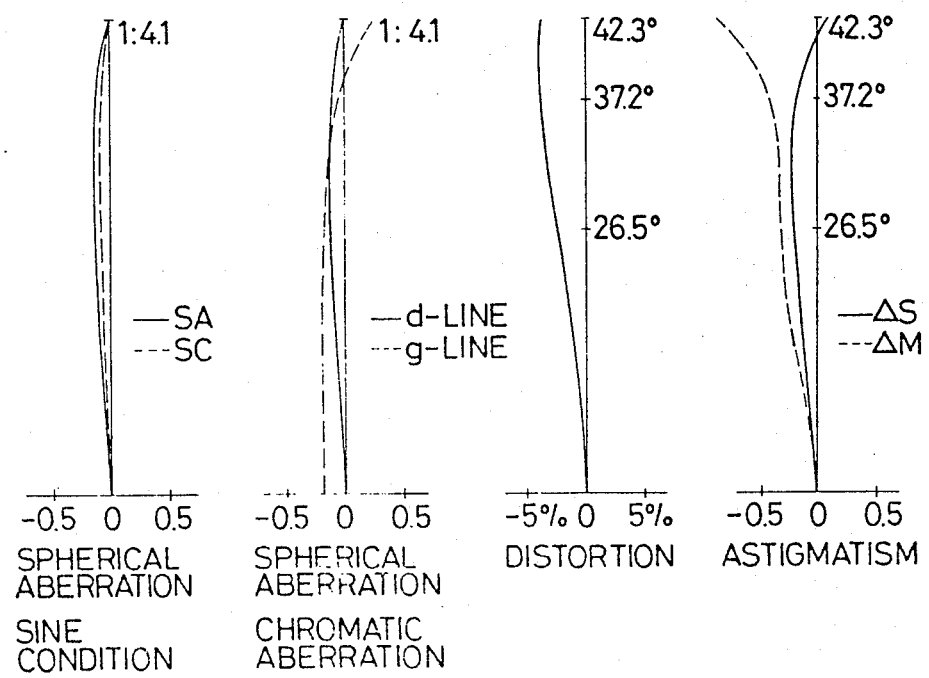
FIGS. 2, 3 and 4 are graphs showing the aberrations in the first Example of the invention at minimum, medium and maximum focal lengths of the zoom lens system, respectively.
Figure 3:
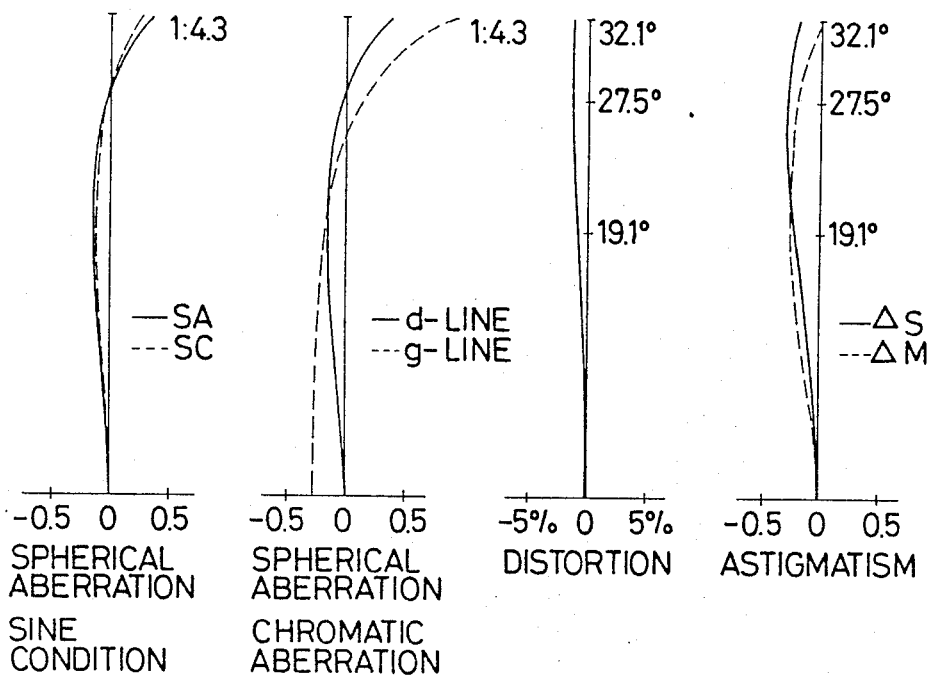
Figure 4:
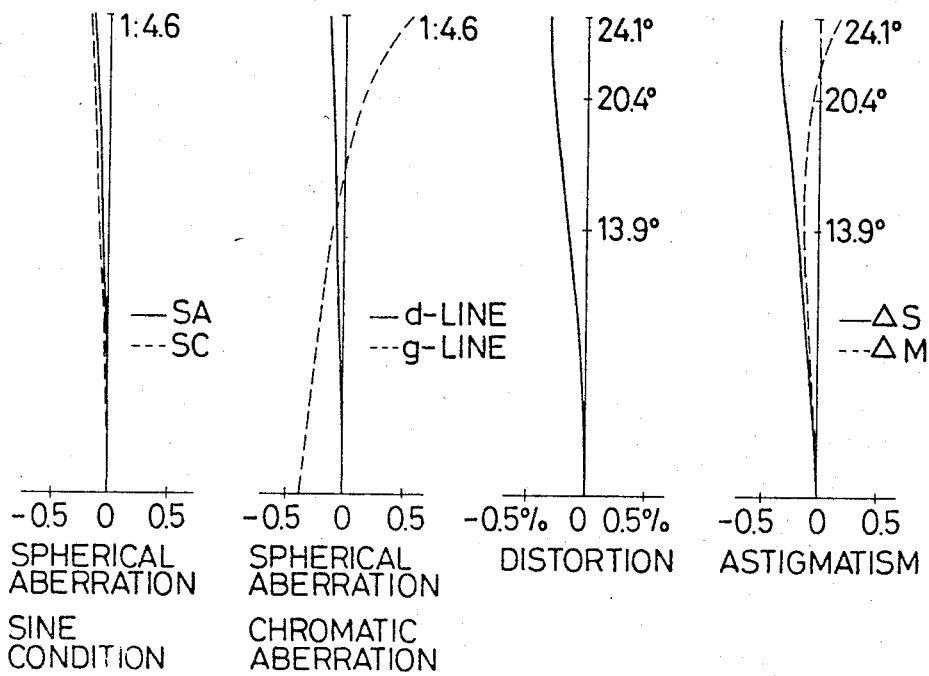

This invention relates to an extremely compact zoom lens having a viewing angle of 85° at the wide angle end, a zoom ratio of approximate 2 and the front most lens aperture of 0.88 Fs. The compact wide angle zoom lens according to the invention comprises a divergent lens group composed, in order from the object side, of a first lens being a negative meniscus lens convex toward the object side, a second lens being a double convex lens or a positive cemented lens composed of positive and negative lenses, a third lens being a negative meniscus lens convex toward the object side, a fourth lens being a negative lens and fifth lens being a positive lens. A convergent lens group is composed of a sixth lens being a positive lens, a positive meniscus lens convex toward the object side, an eighth lens being a double convex lens, a ninth lens being a double concave negative lens, the eighth and ninth lenses cemented to each other and a tenth lens being a positive lens. The two lens groups are mechanically movable to vary the focal length thereof.

The zoom lens system satisfies the following conditions (1) to (4):

(1) $Fs < |f_F| < 1.5 Fs, f_F < 0$ (2) $0.7 Fs < L < Fs$ (3) $n_1 > 1.80$ (4) $2.7 Fs < f_2 < 3.7 Fs$

The symbols are designated as follows:
Fs: the minimum overall focal length,
$f_F$: the focal length of the front lens group,
L: the aerial space between the front and rear lens groups at the minimum overall focal length,
$f_2$: the focal length of the second lens,
F: the resultant overall focal length,
$r_i$: the radius of curvature of the i-th lens,
$d_j$: the lens thickness or lens space of the j-th lens surface,
$n_i$: the refractive index at d-line of the i-th lens, and
$v_i$: the Abbe number of the i-th lens.

Condition (1) relates to miniaturization of a lens system according to the present invention. When $|f_F|$ exceeds 1.5 Fs, astigmatism and coma aberration can be well compensated but the overall size of the lens necessarily becomes large with difficulty of miniaturization thereof. Conversely, when $|f_F|$ becomes smaller than Fs, the lens system can be compact. It is, however, difficult to well compensate for the above-described aberrations in view of the predetermined number of the lens components of the present invention.

Condition (2) is required when Condition (1) is established. When L exceeds Fs, it is difficult to compensate for the various aberrations, particularly coma aberration because of the slant light fluxes with respect to the frontmost lens aperture. The present invention requires pass through the end portions of the rear lenses in the rear lens group. Conversely, when L exceeds 0.7 Fs, the lower limit, in order to satisfy a view angle and a zoom ratio as required for the present invention, the power of the rear lens group is necessarily increased. Accordingly, the variation of the spherical aberration from the minimum overall focal length to the maximum overall focal length is increased, and it is difficult to compensate for it.

Condition (3) is required to decrease the number of the lenses composing the front lens group taking miniaturization of the overall lens into consideration. Specifically, the refractive index of the first negative lens is increased to reduce the optical load to the lens surface without the increase of the number of the lenses. As a result, a compact lens can be obtained.

Condition (4) relates to compensation of distortion. When $f_2$ deviates from the above-described condition, the negative distortion is increased, or the variation amount of the distortion aberration generated in the peripheral portion of the image surface. Either result is undesirable.

The Examples will now be described.

Referring first to FIGS. 1–4, the first example according to this invention will be described with respect to the following tables.

EXAMPLE 1

Resultant Focal Length
$F = 24.7 \sim 48.5$

| Lens | | Radius of Curvature | | Lens Thickness - Lens Space | Refractive Index | | Abbe No. |
|---|---|---|---|---|---|---|---|
| $L_1$ | { | $r_1$ 279.684 | $d_1$ | 1.50 | $n_1$ 1.88300 | $\nu_1$ | 40.8 |
|  |  | $r_2$ 43.521 | $d_2$ | 3.22 |  |  |  |
| $L_2$ | { | $r_3$ 90.739 | $d_3$ | 7.30 | $n_2$ 1.62004 | $\nu_2$ | 36.3 |
|  |  | $r_4$ −99.547 | $d_4$ | 0.10 |  |  |  |
| $L_3$ | { | $r_5$ 45.490 | $d_5$ | 1.40 | $n_3$ 1.88300 | $\nu_3$ | 40.8 |
|  |  | $r_6$ 18.175 | $d_6$ | 5.93 |  |  |  |
| $L_4$ | { | $r_7$ −1067.750 | $d_7$ | 1.50 | $n_4$ 1.64000 | $\nu_4$ | 60.1 |
|  |  | $r_8$ 28.948 | $d_8$ | 2.66 |  |  |  |
| $L_5$ | { | $r_9$ −26.732 | $d_9$ | 3.91 | $n_5$ 1.69895 | $\nu_5$ | 30.1 |
|  |  | $r_{10}$ 221.127 | $d_{10}$ | 21.51∼1.06 |  |  |  |
|  |  | $r_{11}$ 46.089 | $d_{11}$ | 2.46 | $n_6$ 1.67000 | $\nu_6$ | 57.4 |

-continued

Resultant Focal Length
$F = 24.7 \sim 48.5$

Figure 5:
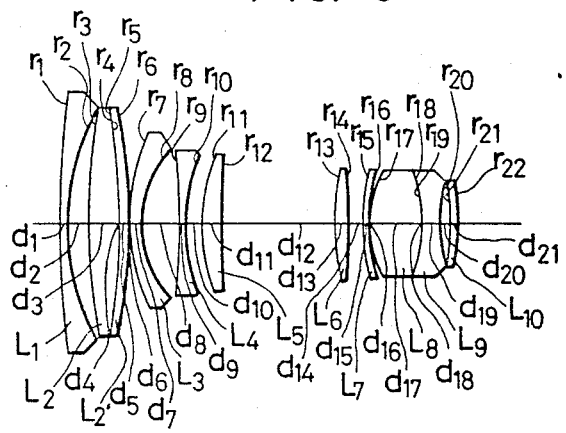
FIG. 5 shows a lens construction according to the second Example of the invention.
Figure 6:
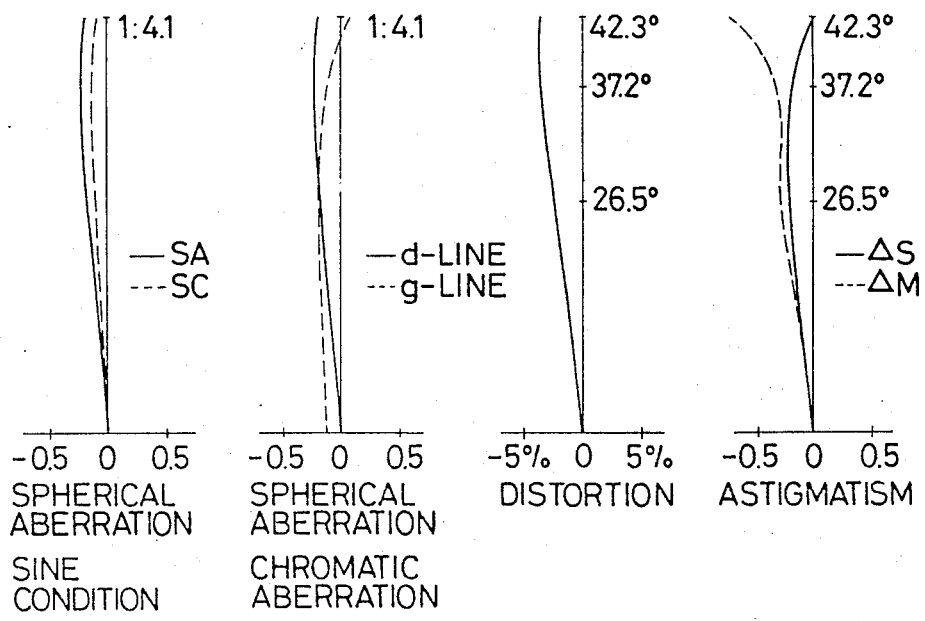
FIGS. 6, 7 and 8 are graphs showing the aberrations in the second Example of the invention at minimum, medium and maximum focal lengths of the zoom lens system, respectively.
Figure 7:
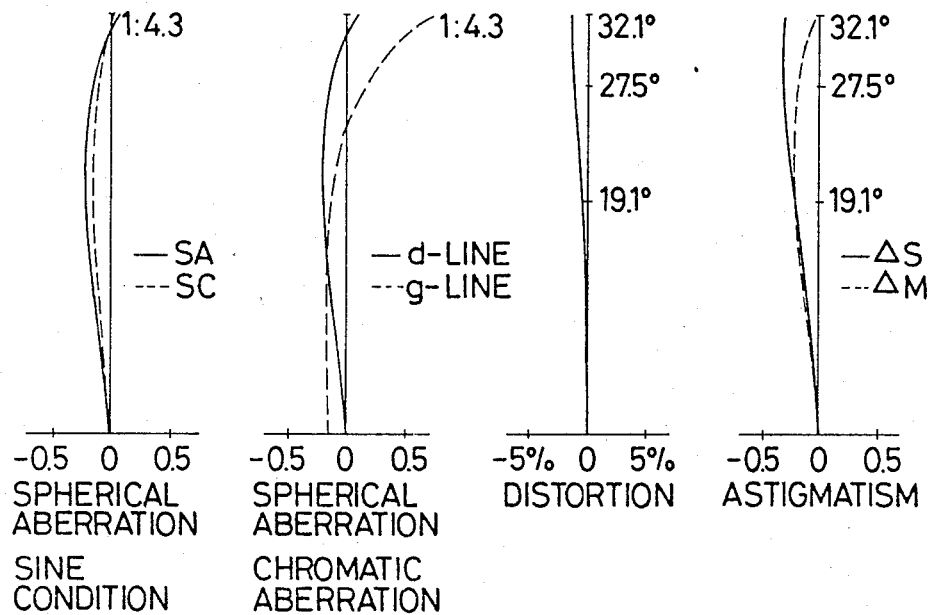
Figure 8:
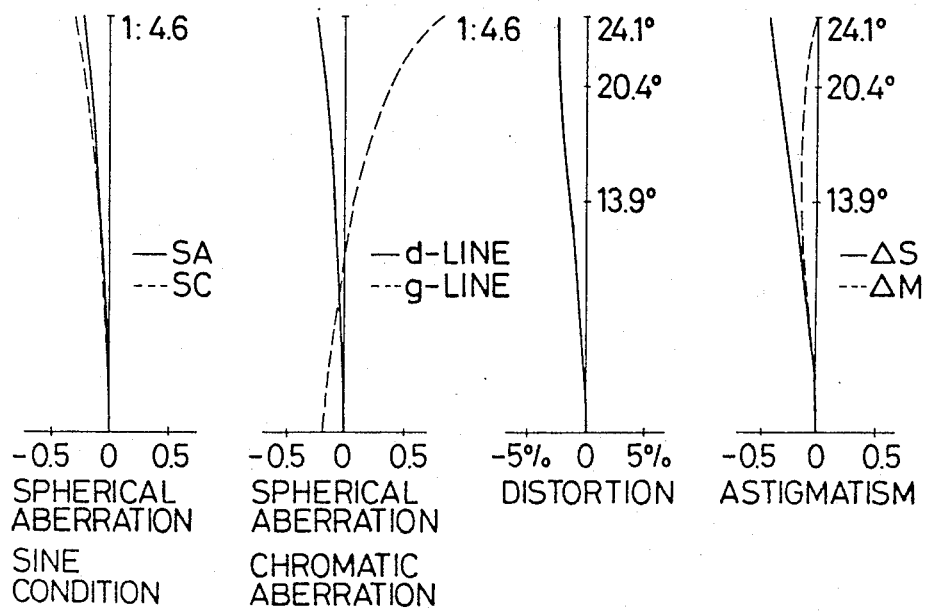

| Lens | | Radius of Curvature | | Lens Thickness - Lens Space | Refractive Index | | Abbe No. |
|---|---|---|---|---|---|---|---|
| $L_6$ | { | $r_{12}$ −162.341 | $d_{12}$ | 2.40 |  |  |  |
| $L_7$ | { | $r_{13}$ 27.215 | $d_{13}$ | 1.78 | $n_7$ 1.68250 | $\nu_7$ | 44.7 |
|  |  | $r_{14}$ 39.045 | $d_{14}$ | 0.10 |  |  |  |
| $L_8$ | { | $r_{15}$ 20.554 | $d_{15}$ | 8.28 | $n_8$ 1.59551 | $\nu_8$ | 39.2 |
|  |  | $r_{16}$ −23.131 | $d_{16}$ | 0.0 |  |  |  |
| $L_9$ | { | $r_{17}$ −23.131 | $d_{17}$ | 2.51 | $n_9$ 1.84666 | $\nu_9$ | 23.9 |
|  |  | $r_{18}$ 17.116 | $d_{18}$ | 2.30 |  |  |  |
| $L_{10}$ | { | $r_{19}$ −193.791 | $d_{19}$ | 2.29 | $n_{10}$ 1.71736 | $\nu_{10}$ | 29.5 |
|  |  | $r_{20}$ −22.084 |  |  |  |  |  | focal length, front group $f_F = -33.039$
focal length, second lens $f_2 = 77.700$ Referring now to FIGS. 5–8, the second Example will be described with respect to the following table. As shown in FIG. 5, the second lens is composed of a positive and negative lens cemented together to form a lens having a positive resultant focal length.

EXAMPLE 2

Resultant Focal Length
$F = 24.7 \sim 48.5$

| Lens | | Radius of Curvature | | Lens Thickness- Lens Space | Refractive Index | | Abbe No. |
|---|---|---|---|---|---|---|---|
| $L_1$ | { | $r_1$ 228.536 | $d_1$ | 1.50 | $n_1$ 1.88300 | $\nu_1$ | 40.8 |
|  |  | $r_2$ 41.340 | $d_2$ | 3.67 |  |  |  |
| $L_2$ | { | $r_3$ 100.246 | $d_3$ | 5.52 | $n_2$ 1.60342 | $\nu_2$ | 38.0 |
|  |  | $r_4$ −85.725 | $d_4$ | 0.0 |  |  |  |
| $L_{2'}$ | { | $r_5$ −85.725 | $d_5$ | 1.50 | $n_3$ 1.81600 | $\nu_3$ | 46.6 |
|  |  | $r_6$ −92.300 | $d_6$ | 0.10 |  |  |  |
| $L_3$ | { | $r_7$ 34.227 | $d_7$ | 1.40 | $n_4$ 1.83481 | $\nu_4$ | 42.7 |
|  |  | $r_8$ 16.900 | $d_8$ | 6.44 |  |  |  |
| $L_4$ | { | $r_9$ −144.780 | $d_9$ | 1.42 | $n_5$ 1.61800 | $\nu_5$ | 63.4 |
|  |  | $r_{10}$ 29.610 | $d_{10}$ | 2.74 |  |  |  |
| $L_5$ | { | $r_{11}$ 27.353 | $d_{11}$ | 3.49 | $n_6$ 1.69895 | $\nu_6$ | 30.1 |
|  |  | $r_{12}$ 189.000 | $d_{12}$ | 20.12∼0.89 |  |  |  |
| $L_6$ | { | $r_{13}$ 48.070 | $d_{13}$ | 2.28 | $n_7$ 1.67000 | $\nu_7$ | 57.4 |
|  |  | $r_{14}$ −148.000 | $d_{14}$ | 2.40 |  |  |  |
| $L_7$ | { | $r_{15}$ 27.832 | $d_{15}$ | 1.62 | $n_8$ 1.61800 | $\nu_8$ | 63.4 |
|  |  | $r_{16}$ 37.630 | $d_{16}$ | 0.10 |  |  |  |
| $L_8$ | { | $r_{17}$ 19.668 | $d_{17}$ | 8.95 | $n_9$ 1.58144 | $\nu_9$ | 40.7 |
|  |  | $r_{18}$ −24.213 | $d_{18}$ | 0.0 |  |  |  |
| $L_9$ | { | $r_{19}$ −24.213 | $d_{19}$ | 2.51 | $n_{10}$ 1.84666 | $\nu_{10}$ | 23.9 |
|  |  | $r_{20}$ 17.350 | $d_{20}$ | 1.92 |  |  |  |
| $L_{10}$ | { | $r_{21}$ 2444.907 | $d_{21}$ | 2.17 | $n_{11}$ 1.72151 | $\nu_{11}$ | 29.2 |
|  |  | $r_{22}$ −23.370 |  |  |  |  |  | focal length, front group $f_F = -31.816$
focal length, second lens $f_2 = 81.818$

What is claimed is:

1. A compact wide angle zoom lens, comprising in order from the object side; a divergent front lens group and a convergent rear lens group, the overall focal length being variable by mechanical movement of the front and rear lens groups; said divergent front lens group being composed, in order from the object side, of a first lens being a negative meniscus lens convex toward the object side, a second lens being a double convex positive lens, a third lens being a negative meniscus lens convex toward the object side, a fourth lens being a negative lens and a fifth lens being a positive lens; said convergent rear lens group being composed of a sixth lens being a positive lens, a seventh lens being a positive meniscus lens convex toward the object, an eighth lens being a double convex positive lens, a ninth lens being a double concave negative lens, the eighth and ninth lenses being cemented to each other, and a tenth lens being positive lens, wherein the overall lens system composed of ten lens elements is grouped into nine lens components, the lens system satisfying the following conditions:

Resultant Focal Length
F = 24.7~48.5

| Lens | | Radius of Curvature | Lens Thickness - Lens Space | | Refractive Index | Abbe No. | |
|---|---|---|---|---|---|---|---|
| $L_1$ | { | $r_1$ 279.684 | $d_1$ | 1.50 | $n_1$ 1.88300 | $v_1$ | 40.8 |
| | | $r_2$ 43.521 | $d_2$ | 3.22 | | | |
| $L_2$ | { | $r_3$ 90.739 | $d_3$ | 7.30 | $n_2$ 1.62004 | $v_2$ | 36.3 |
| | | $r_4$ −99.547 | $d_4$ | 0.10 | | | |
| $L_3$ | { | $r_5$ 45.490 | $d_5$ | 1.40 | $n_3$ 1.88300 | $v_3$ | 40.8 |
| | | $r_6$ 18.175 | $d_6$ | 5.93 | | | |
| $L_4$ | { | $r_7$ −1067.750 | $d_7$ | 1.50 | $n_4$ 1.64000 | $v_4$ | 60.1 |
| | | $r_8$ 28.948 | $d_8$ | 2.66 | | | |
| $L_5$ | { | $r_9$ −26.732 | $d_9$ | 3.91 | $n_5$ 1.69895 | $v_5$ | 30.1 |
| | | $r_{10}$ 221.127 | $d_{10}$ | 21.51~1.06 | | | |
| $L_6$ | { | $r_{11}$ 46.089 | $d_{11}$ | 2.46 | $n_6$ 1.67000 | $v_6$ | 57.4 |
| | | $r_{12}$ −162.341 | $d_{12}$ | 2.40 | | | |
| | | $r_{13}$ 27.215 | $d_{13}$ | 1.78 | $n_7$ 1.68250 | $v_7$ | 44.7 |

-continued

Resultant Focal Length
F = 24.7~48.5

| Lens | | Radius of Curvature | Lens Thickness - Lens Space | | Refractive Index | Abbe No. | |
|---|---|---|---|---|---|---|---|
| $L_7$ | { | $r_{14}$ 39.045 | $d_{14}$ | 0.10 | | | |
| | | $r_{15}$ 20.554 | $d_{15}$ | 8.28 | $n_8$ 1.59551 | $v_8$ | 39.2 |
| $L_8$ | { | $r_{16}$ −23.131 | $d_{16}$ | 0.0 | | | |
| | | $r_{17}$ −23.131 | $d_{17}$ | 2.51 | $n_9$ 1.84666 | $v_9$ | 23.9 |
| $L_9$ | { | $r_{18}$ 17.116 | $d_{18}$ | 2.30 | | | |
| | | $r_{19}$ −193.791 | $d_{19}$ | 2.29 | $n_{10}$ 1.71736 | $v_{10}$ | 29.5 |
| $L_{10}$ | { | $r_{20}$ −22.084 | | | | | | focal length, front group    focal length, second lens
$f_F = -33.039$    $f_2 = 77.700$ 2. A compact wide angle zoom lens, comprising in order from the object side; a divergent front lens group and a convergent rear lens group, the overall focal length being variable by mechanical movement of the front and rear lens groups; said divergent front lens group being composed, in order from the object side, of a first lens being a negative meniscus lens convex toward the object side, a second lens being a double convex positive lens and a negative lens cemented to each other to have a positive resultant focal length, a third lens being a negative meniscus lens convex toward the object side, a fourth lens being a negative lens and a fifth lens being a positive lens; said convergent rear lens group being composed of a sixth lens being a positive lens, a seventh lens being a positive meniscus lens convex toward the object, an eighth lens being a double convex positive lens, a ninth lens being a double concave negative lens, the eighth and ninth lenses being cemented to each other, and a tenth lens being positive lens, wherein the overall lens system composed of eleven lens elements is grouped into nine lens components, the lens system satisfying the following conditions:

Resultant Focal Length
F = 24.7~48.5

| Lens | | Radius of Curvature | Lens Thickness - Lens Space | | Refractive Index | Abbe No. | |
|---|---|---|---|---|---|---|---|
| $L_1$ | { | $r_1$ 228.536 | $d_1$ | 1.50 | $n_1$ 1.88300 | $v_1$ | 40.8 |
| | | $r_2$ 41.340 | $d_2$ | 3.67 | | | |
| $L_2$ | { | $r_3$ 100.246 | $d_3$ | 5.52 | $n_2$ 1.60342 | $v_2$ | 38.0 |
| | | $r_4$ −85.725 | $d_4$ | 0.0 | | | |
| $L_{2'}$ | { | $r_5$ −85.725 | $d_5$ | 1.50 | $n_3$ 1.81600 | $v_3$ | 46.6 |
| | | $r_6$ −92.300 | $d_6$ | 0.10 | | | |
| $L_3$ | { | $r_7$ 34.227 | $d_7$ | 1.40 | $n_4$ 1.83481 | $v_4$ | 42.7 |
| | | $r_8$ 16.900 | $d_8$ | 6.44 | | | |
| $L_4$ | { | $r_9$ −144.780 | $d_9$ | 1.42 | $n_5$ 1.61800 | $v_5$ | 63.4 |
| | | $r_{10}$ 29.610 | $d_{10}$ | 2.74 | | | |
| $L_5$ | { | $r_{11}$ 27.353 | $d_{11}$ | 3.49 | $n_6$ 1.69895 | $v_6$ | 30.1 |
| | | $r_{12}$ 189.000 | $d_{12}$ | 20.12~0.89 | | | |
| $L_6$ | { | $r_{13}$ 48.070 | $d_{13}$ | 2.28 | $n_7$ 1.67000 | $v_7$ | 57.4 |
| | | $r_{14}$ −148.000 | $d_{14}$ | 2.40 | | | |
| $L_7$ | { | $r_{15}$ 27.832 | $d_{15}$ | 1.62 | $n_8$ 1.61800 | $v_8$ | 63.4 |
| | | $r_{16}$ 37.630 | $d_{16}$ | 0.10 | | | |

-continued

Resultant Focal Length
F = 24.7~48.5

| Lens | | Radius of Curvature | Lens Thickness-Lens Space | | Refractive Index | | Abbe No. | |
|---|---|---|---|---|---|---|---|---|
| $L_8$ | $r_{17}$ | 19.668 | $d_{17}$ | 8.95 | $n_9$ | 1.58144 | $\nu_9$ | 40.7 |
| | $r_{18}$ | −24.213 | $d_{18}$ | 0.0 | | | | |
| $L_9$ | $r_{19}$ | −24.213 | $d_{19}$ | 2.51 | $n_{10}$ | 1.84666 | $\nu_{10}$ | 23.9 |
| | $r_{20}$ | 17.350 | $d_{20}$ | 1.92 | | | | |
| $L_{10}$ | $r_{21}$ | 2444.907 | $d_{21}$ | 2.17 | $n_{11}$ | 1.72151 | $\nu_{11}$ | 29.2 |
| | $r_{22}$ | −23.370 | | | | | | | focal length, front group $f_F = -31.816$
focal length, second lens $f_2 = 81.818$

* * * * *

UNITED STATES PATENT AND TRADEMARK OFFICE
CERTIFICATE OF CORRECTION

PATENT NO. : 4,241,981

DATED : December 30, 1980

INVENTOR(S) : Sadao Okudaira

It is certified that error appears in the above—identified patent and that said Letters Patent is hereby corrected as shown below:

Column 3, Example 1, change the value of the radius of curvature $r_9$ from "-26.732" to --26.732--.

Column 5, claim 1, change the value of the radius of curvature $r_9$ from "-26.732" to --26.732--.

Signed and Sealed this

Twelfth Day of May 1981

[SEAL]

Attest:

RENE D. TEGTMEYER

Attesting Officer    Acting Commissioner of Patents and Trademarks